INVENTOR.
B. THOMAS SHIRK

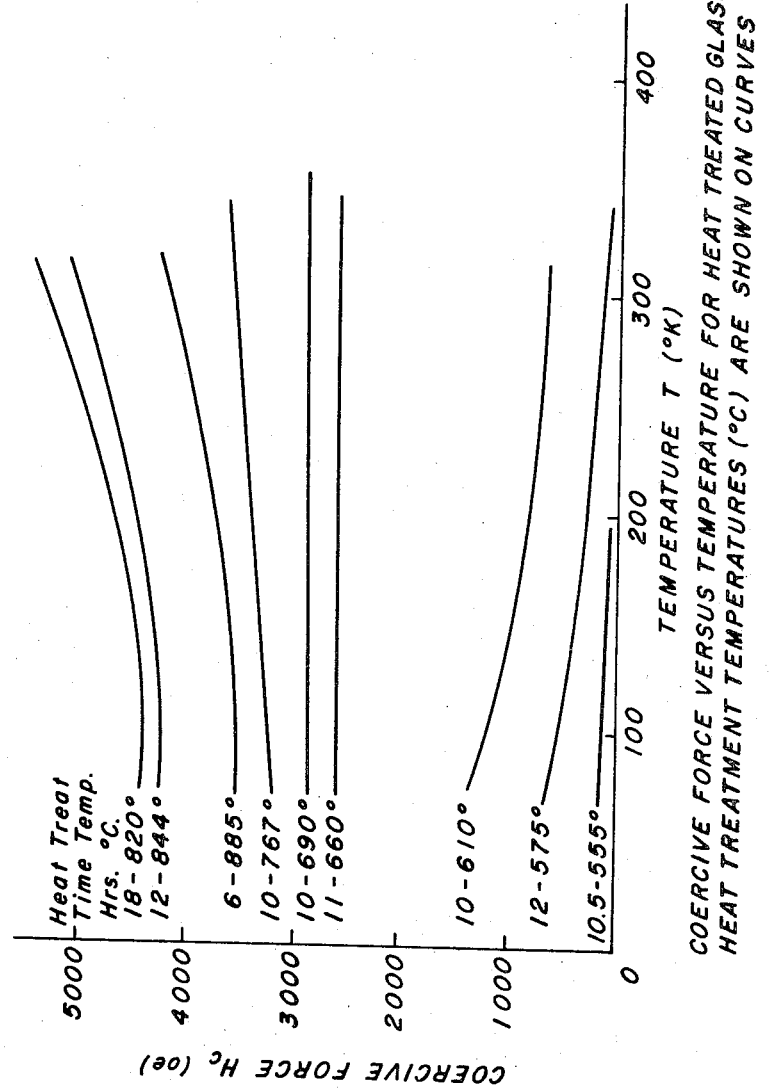

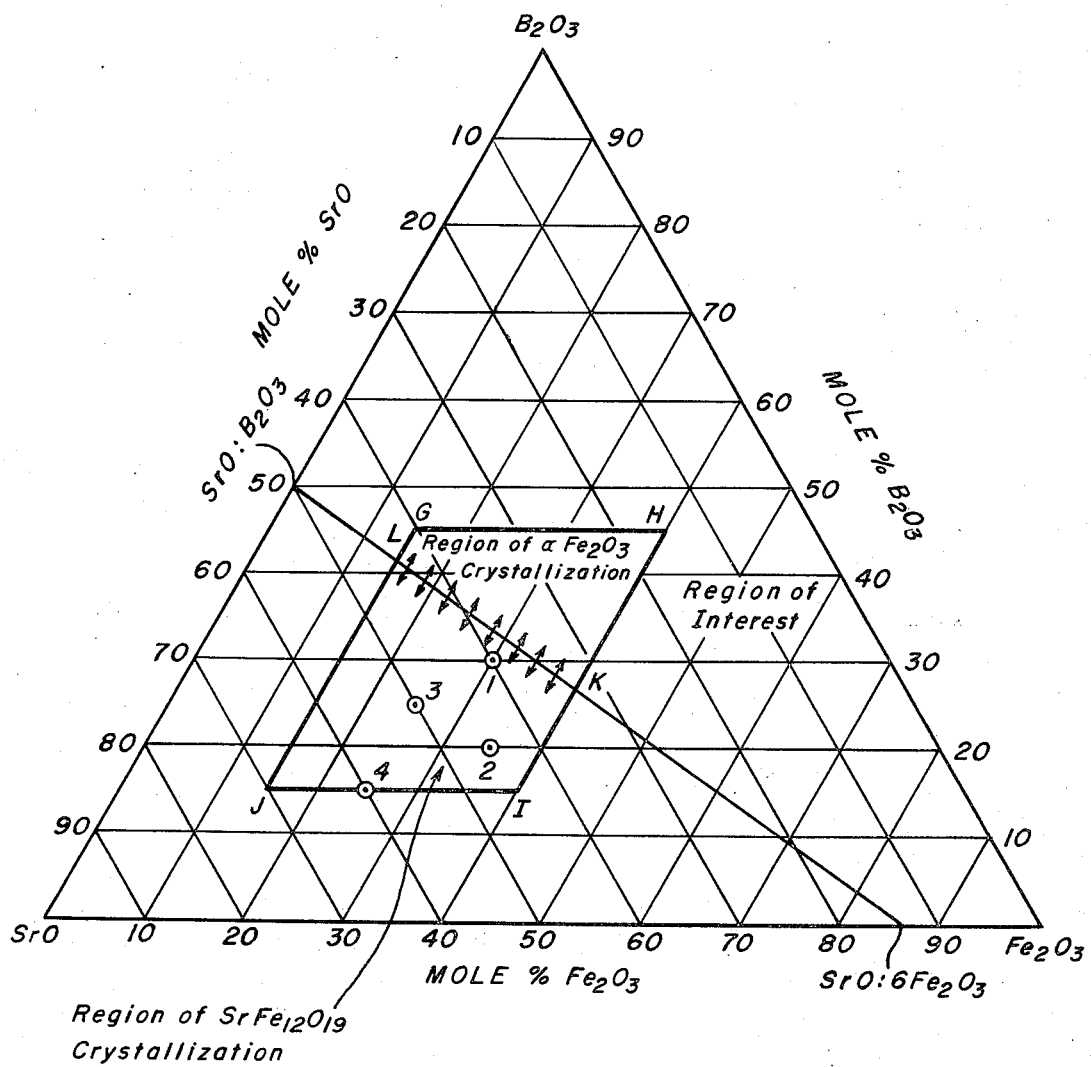

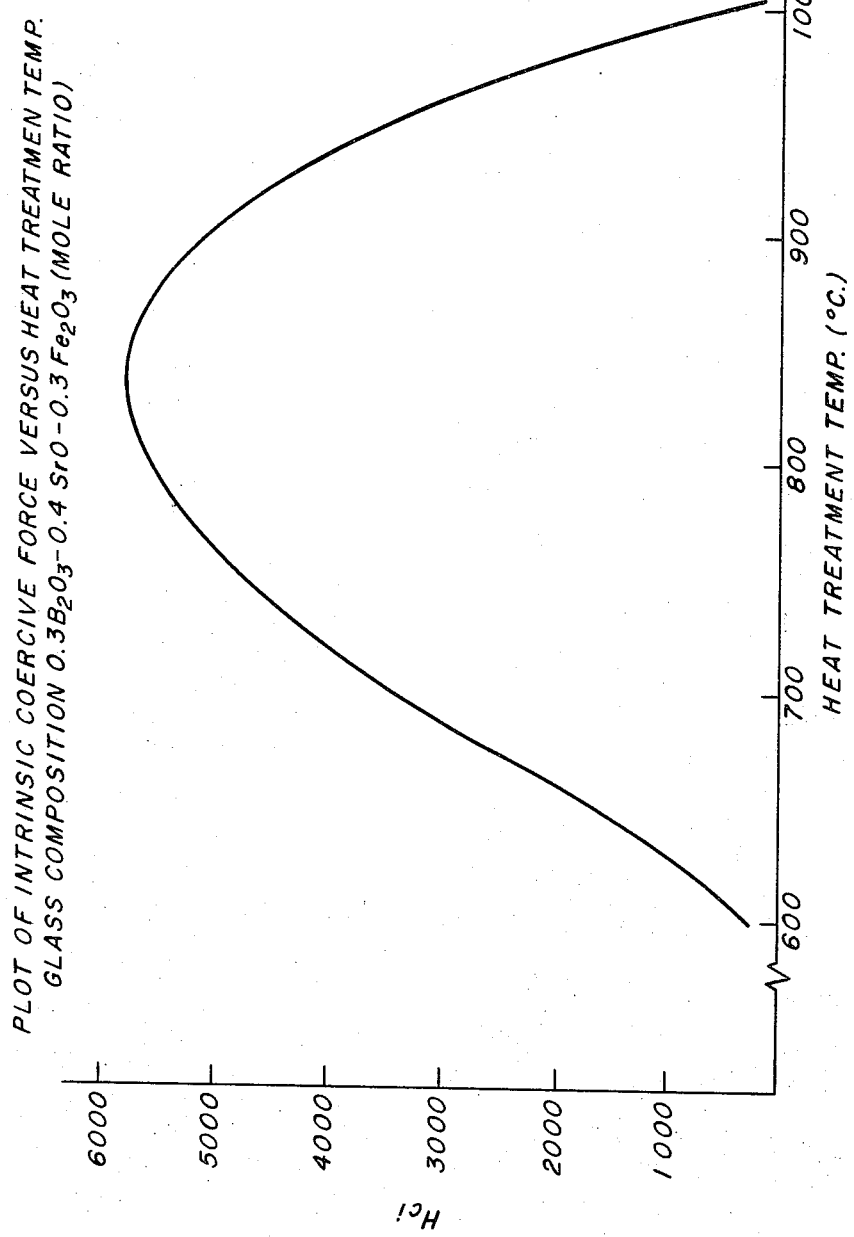

United States Patent Office 3,716,630
Patented Feb. 13, 1973

3,716,630
HARD MAGNETIC FERRITES
Brian Thomas Shirk, St. Marys, Pa., assignor to
Stackpole Carbon Company, St. Marys, Pa.
Continuation-in-part of application Ser. No. 829,579,
June 2, 1969, which is a continuation-in-part of
application Ser. No. 812,158, Apr. 1, 1969. This
application July 2, 1970, Ser. No. 51,880
The portion of the term of the patent subsequent to
Dec. 28, 1988, has been disclaimed
Int. Cl. C01f 11/00; C01g 49/00
U.S. Cl. 423—594                                    1 Claim

ABSTRACT OF THE DISCLOSURE

Hard magnetic ferrites of the formula $MO \cdot 6Fe_2O_3$ where M is barium, strontium or lead, are made by providing a molten borate composition containing the metal oxide and ferric oxide in amounts corresponding to the desired ferrite, cooling the melt below the liquidus either so rapidly as to convert the melt to a glass which upon appropriate heat treatment undergoes nucleation and crystallization of the ferrite, or at a rate such that devitrification and ferrite crystallization occurs during cooling. Both procedures result in a borate-rich matrix containing the crystallized ferrite which can be easily recovered separately from other matrix substances by, for example, magnetic separation or dissolution of the borate matrix material in a weak acid.

This application is a continuation-in-part of my copending application 829,579, filed June 2, 1969, which was in turn a continuation-in-part of my earlier copending application Ser. No. 812,158, filed Apr. 1, 1969.

This invention relates to the ferrites of group barium and strontium having the so-called magnetoplumbite structure $MO \cdot 6Fe_2O_3$ in which M is a divalent metal. These ferrites have a hexagonal crystal lattice and they are characterized by good magnetic properties.

Barium ferrite ($BaFe_{12}O_{19}$) magnetic materials are well known and have been used for various purposes where hard magnetic properties are needed, for instance for making rubber magnets. $SrFe_{12}O_{19}$ are similar chemically, structurally and magnetically to the barium compound.

It is desirable and necessary for hard ferrite powders to have a high value of intrinsic coercive force ($H_{ci}$). It is well known, at least qualitatively, what factors are necessary in order to achieve high quality ferrite powder of high $H_{ci}$. Ferrite powders with highest $H_{ci}$ comprise particles which have a narrow size distribution centered about a size in the range 0.4 to 1.0 micron and which are free from stresses and strains caused by crystalline defects. The present invention discloses a method wherein high quality hard magnetic ferrite powders are produced which have the above stated characteristics.

These ferrites have commonly been made by solid state reaction of ferric oxide ($Fe_2O$) and oxide of the metal or a compound of the metal (Ba or Sr) convertible to the oxide by heat. Although the ferrites may be produced in this way, the procedure is attended by undesirable factors; that is, the particle size cannot ordinarily be well controlled whereby some particles are larger or smaller than the optimum range of particle size for maximum magnetic quality. Also, the particles produced by solid state reaction may tend to form large agglomerated crystallites as well as particles of greater than optimum size which would have to be broken up by milling or grinding down the agglomerates and the large multiple-domain particles, a procedure that would be objectionable in that it would both produce particles below the lower size limit, for instance below the superparamagnetic critical size, and also, it would have a tendency to produce particles having objectionably large stresses and dislocations. Experience has shown that grinding or milling does not give a product of optimum particle size and optimum magnetic quality.

It has been proposed also to make barium ferrite by a coprecipitation and ignition technique (e.g., Mee and Jeschke, J. Appl. Phys. 34 (4), 1271 (1963)) but as far as is known to me such practices have not been used in the commercial production of ferrites.

The invention will be described with reference to the accompanying drawings, in which FIG. 1 is a triangular diagram representing the system $B_2O_3$—$BaO$—$Fe_2O_3$;

FIG. 2 illustrates, with reference to the preferred embodiment of the barium ferrite embodiment of the invention, the coercive force as a function of temperature for one barium ferrite glass crystallized during the times and at the temperatures shown in the drawing;

FIG. 3 is a triangular diagram of the system $$SrO—Fe_2O_3—B_2O_3$$

and

Figure 1:
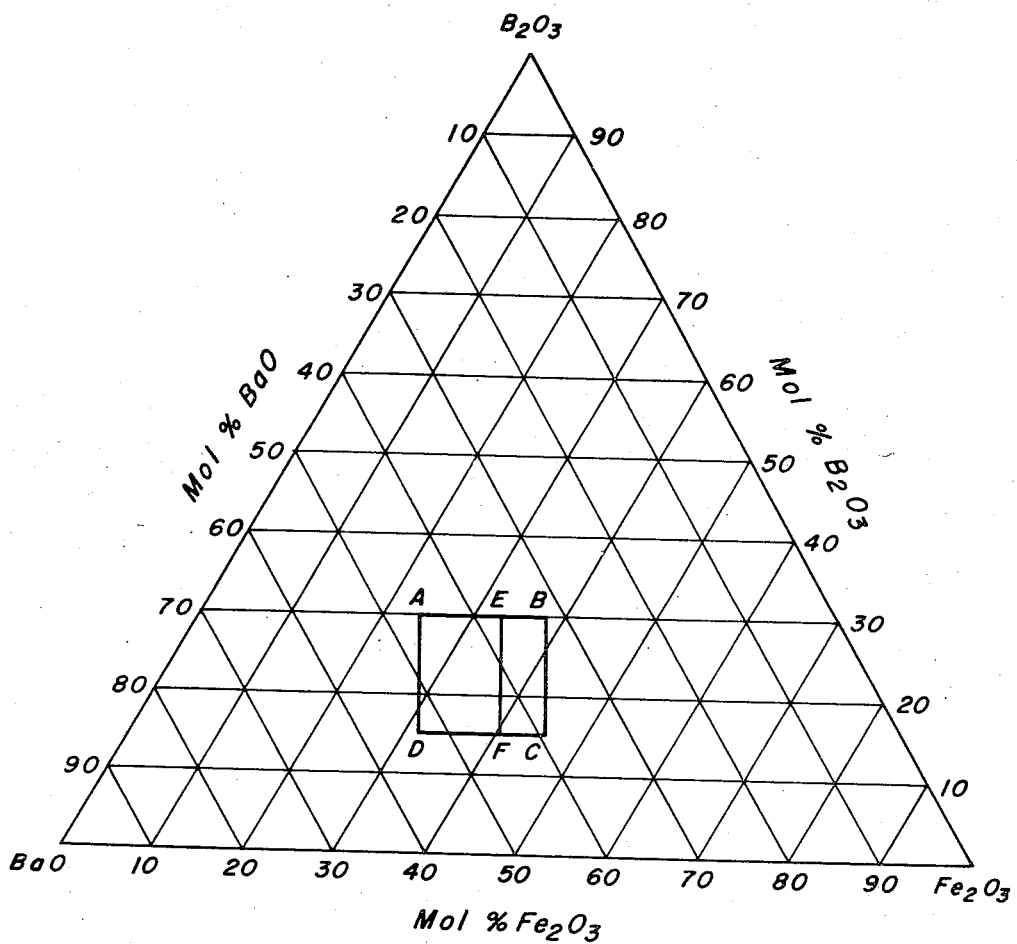

FIG. 4 is a plot of intrinsic coercive force versus heat treatment temperature of a strontium ferrite glass of the composition 0.3 $B_2O_3$—0.4 SrO—0.3 $Fe_2O_3$ (mole ratio).

The invention is predicated upon my discovery that ferrite of a metal of the group barium and strontium can be made by forming a homogeneous melt of boric oxide, ferric oxide and oxide of said metal in proportions productive of the magneto-plumbite structure, $MO \cdot 6Fe_2O_3$, where M is selected from the group barium and strontium.

Three controlling features are essential to successful practice of the invention: (1) the composition is to be such as to produce the desired ferrite as the only magnetic phase present (in high yield for economic reasons), (2) the molten composition is to be substantially free from unmelted and crystalline materials i.e., consist of a homogeneous liquid, and (3) the melt is to be quenched in such a manner as to effect crystallization of the ferrite from the borate-rich matrix.

Typically, the ferrite is formed in a homogeneous borate-rich melt, free, or substantially free, from undissolved and crystalline material, which is quenched from the molten, or liquid, state. In one modification the melt is quenched rapidly enough to convert it to a glass, or near glass, which can be heat treated to nucleate and crystallize the ferrite from the glass. In another modification, the melt is quenched at and below its liquidus at a rate sufficient to crystallize the ferrite in the quenching process, as by air cooling, for example. In both modifications the ferrite can be recovered by leaching it from the borate-rich matrix with a weak acid.

In the first modification the rapid quench necessary for glass formation may be accomplished by passing the melt between two metal rollers, suitably of brass, which form the glass into a ribbon about 0.1 mm. thick. Thus rapid quenching to the glassy state is achieved while the liquid is in contact with the rollers because of the high thermal capacity of the metal. The glass ribbon will also cool quickly because of the high surface area to volume ratio. The ferrite may then be developed by selective heat treatment of the glass during which devitrification and crystallization occur, as will more fully appear hereinafter.

In the second modification the molten liquid is quenched at a rate sufficient to cause devitrification during the cooling period. This might be, as indicated above, a normal air cool or it might also be an air quench to the heat treatment temperature at which optimum devitrification occurs.

The quenching rates in time-temperature terms necessary to form glass or to devitrify during cooling will vary with, for example, the composition of the melt, the initial temperature of the melt, and the mass of melt being quenched. However, the first modification is exemplified by the roller quenching procedure alluded to above. In the second modification the occurrence of devitrification can be determined by, for example, X-ray methods.

Although not essential for all purposes, as indicated above, it is desirable that the quenched melt be in a glassy condition (first modification) because in that way the coercive force can be studied as a function of particle size. That is, starting with such a glass and controlling the crystallite size by the temperature of heat treatment, it is possible to find the optimum size which will produce the highest value of coercive force.

The invention will be described in detail with reference to barium ferrite although it will be understood that the procedure described typifies generally the production of strontium ferrite. Barium ferrite melts at an extremely high temperature so that it is not feasible to prepare it directly from its constituent oxides. However, by the addition of $B_2O_3$ to the system $BaO-Fe_2O_3$ the melting point can be lowered greatly, even to about 1000° C. Thus a composition of (in molar proportions) 0.265 $B_2O_3$—0.45 BaO—0.33 $Fe_2O_3$ easily forms a glass by roller quenching.

To this end there were prepared melts from BaO, $Fe_2O_3$ and $B_2O_3$ in varying proportions, and the melts were quenched to glasses by the roller process described above.

The glasses thus produced were heat treated to cause nucleation and crystallization of barium ferrite dispersed in a borate-rich matrix composed largely of barium metaborate ($BaB_2O_4$) and possibly a small amount of barium ferrite ($BaFe_2O_4$). The barium ferrite was recovered easily from the matrix material by treatment with a weak acid, in this case a 10 percent solution of acetic acid.

In general, glasses within the area ABCD of FIG. 1 can be used to make barium ferrite in accordance with the invention. All of these glasses when heat treated crystallize barium ferrite. Compositions outside the area ABCD may produce alpha-ferric oxide ($Fe_2O_3$) upon heat treatment, and some compositions may crystallize both ferric oxide and barium ferrite but these are generally unsuited to magnetic uses because the iron oxide present dilutes the barium ferrite and introduces an unknown and unwanted magnetic quality. It is characteristic of this invention that iron oxides are not present in the heat treated ferrite products.

Glasses can be formed in the region EBFC when the cooling rate is faster than described above.

The heat treatment of the quenched glasses consists of heating them to a temperature and for a time to cause nucleation and crystallization of the barium ferrite. The time and temperature needed for this purpose will depend, as will be understood, upon the particular composition being treated and the product particle size desired, which will in turn have a bearing upon the coercive force. This heat treatment may be carried out in air. My experience has shown that compositions of 0.265 $B_2O_3$, 0.405 BaO, and 0.33 $Fe_2O_3$ (molar) are productive of useful properties if heat treated 660° and 885° C. It may be said that the particle size tends to increase with increasing temperature.

As exemplifying this embodiment of the invention, reference may be made to a glass made from, in molar proportions, 26.5% of $B_2O_3$, 40.5% of BaO, and 33% of $Fe_2O_3$. This composition crystallizes barium ferrite in the range from 500° to 900° C. FIG. 2 represents the coercive forces at various temperatures developed by the barium ferrite of the composition just stated when produced by crystallization from the glass at the temperatures indicated in connection with each curve. With this glass heated at 820° for 18 hours an intrinsic coercive force of 5350 oe. was measured, which is the highest value of coercive force ever reported for an isotropic assembly of barium ferrite particles.

Although in general the compositions productive of barium ferrite in accordance with the invention may be satisfactorily crystallized in the range from 500° to 800° C., some compositions lying at or toward the line FD of FIG. 1 may crystallize barium ferrite only at higher temperatures; thus, a glass made from, in molar proportions, 15% of $B_2O_3$, 47.5% of BaO and 37.5% of $Fe_2O_3$ crystallizes the ferrite only at 800° to 900° C.; such a situation is not necessarily objectionable because crystallization at such temperatures may give a particle size providing optimum magnetic properties for some purposes.

Although the invention has been described with reference to the production of the glasses from their oxides, it will be understood that the constituent oxides may be supplied by compositions containing compounds of boron, barium or iron that are productive of the oxides at the glass-making temperatures needed provided their reaction or decomposition products do not contribute objectionable impurities to the ultimate glass. Thus the glasses may be made from ferric oxide, barium carbonate and boric acid with $H_2O$ and $CO_2$ being evolved during melting.

It will be understood that there also may be used other oxides of those metals which are converted to their monoxides at the temperatures necessary to melt the glasses. Thus, it has been reported that the following oxides decompose to monoxide at the temperatures noted:

$SrO_2$—215° C.

In like manner $SrFe_{12}O_{19}$ may be made from the system $SrO-Fe_2O_3$ and $B_2O_3$, due consideration being given to the use of compositions productive of the desired ferrite in good yield and with minimal production of $Fe_2O_3$ in the heat treated glass. This can be determined by simply survey of the system in a manner known in the art. Likewise, heat treatment temperatures and times in the cases of strontium ferrite glasses can be determined simply, as will be understood. And as in the case of $BaFe_{12}O_{19}$, the oxides may be supplied by compounds which have no deleterious effect upon the desired products.

The invention may be described further with reference to strontium ferrite. A wide variation in compositions of $B_2O_3-SrO-Fe_2O_3$ is productive of strontium ferrite. In my investigation, compositions within the area GHIJ of FIG. 3, which may be termed the "region of interest" were prepared from $H_3BO_3$, $SrCO_3$ and $Fe_2O_3$. They were melted at temperatures between 1250° and 1400° C. and roller quenched. All the compositions within the region of interest formed glasses or near glasses when quenched.

When these compositions were heat treated at 800° C. for eighteeen hours devitrification to alpha $Fe_2O_3$ occured in the area GHKL and to $SrFe_{12}O_{19}$ occured in the area LKIJ as shown in FIG. 3, as identified by X-ray diffraction. These were the only iron containing phases found. The only other phase present were $SrB_2O_4$ and $Sr_2B_2O_5$.

Four compositions shown in FIG. 3 were heat treated at temperatures between 600° C. and 1000° C. for sixteen hours and investigated by X-ray diffraction. The mole composition of the four samples are as follows:

(No. 1)    0.30 $B_2O_3$—0.40 SrO—0.30 $Fe_2O_3$ (No. 2)    0.20 $B_2O_3$—0.45 SrO—0.35 $Fe_2O_3$ (No. 3)    0.25 $B_2O_3$—0.50 SrO—0.25 $Fe_2O_3$ (No. 4)    0.15 $B_2O_3$—0.60 SrO—0.25 $Fe_2O_3$

These compositions are indicated on FIG. 3. It was found that between 800° C. and 1000° C., $SrFe_{12}O_{19}$ was the only iron containing phase for all of these compositions. Below 800° C. $SrFe_{12}O_{19}$ was still a major iron-containing phase although some alpha $Fe_2O_3$ was, at times, mixed with the ferrite.

A roller quenched glass with composition No. 1 was heat treated at a range of temperatures between 550° C. and 1000° C. for sixteen hours. With this composition, $SrFe_{12}O_{19}$ is the only iron-containing phase crystallized at these temperatures.

The magnetic properties especially $H_{ci}$ of the recrystallized glass were investigated at room temperature. The results of this investigation are indicated in FIG. 4. The $H_{ci}$ upon heat treatment at 850° C., $H_{ci}$ was 5800; this is the highest value ever recorded for this material.

An advantage of this process is also that the ferrite powder can be freed from the strontium borate matrix by leaching with a weak acid. Quite obviously, this method of preparing $SrFe_{12}O_{19}$ leads to an exceptionally high quality powder. Such high quality is not known for it in the present state of the art.

The non-ferrite and non-magnetic phases produced are readily separated from the ferrite, as indicated above, and may be tolerated in any event where their diluting effect is not objectionable. Barium ferrite is not ferromagnetic and at any rate is present in only minute amounts and is not present at all at glass heat treatment temperatures above 767° C.

I claim:
1. That method of making strontium ferrite comprising the steps of forming a homogeneous melt of $B_2O_3$, SrO and $Fe_2O_3$ in the area LKIJ of FIG. 3, quenching the melt to a homogeneous glass substantially free from undissolved and crystalline materials, and heating the glass to nucleate and crystallize strontium ferrite in a borate-rich matrix.

References Cited

UNITED STATES PATENTS

| | | | |
|---|---|---|---|
| 3,258,434 | 6/1966 | Mackenzie et al. | 106—47 X |
| 3,117,934 | 1/1964 | Linares | 23—51 |
| 3,384,449 | 5/1968 | Au Coin et al. | 23—51 |

HERBERT T. CARTER, Primary Examiner

U.S. Cl. X.R.

106—47